(12) United States Patent
Shigeta et al.

(10) Patent No.: US 8,047,697 B2
(45) Date of Patent: Nov. 1, 2011

(54) BACKLIGHT

(75) Inventors: Hiroaki Shigeta, Osaka (JP); Masanobu Okano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/677,180

(22) PCT Filed: Sep. 8, 2008

(86) PCT No.: PCT/JP2008/066163
§ 371 (c)(1),
(2), (4) Date: Mar. 9, 2010

(87) PCT Pub. No.: WO2009/034943
PCT Pub. Date: Mar. 19, 2009

(65) Prior Publication Data
US 2011/0007520 A1    Jan. 13, 2011

(30) Foreign Application Priority Data
Sep. 10, 2007   (JP) ................. 2007-233610

(51) Int. Cl.
*F21V 33/00* (2006.01)
(52) U.S. Cl. .................. 362/612; 362/620; 362/618
(58) Field of Classification Search .............. 362/611, 362/612, 613
See application file for complete search history.

(56) References Cited

U.S. PATENT DOCUMENTS

| | | | |
|---|---|---|---|
| 5,381,309 A * | 1/1995 | Borchardt | 362/612 |
| 5,671,028 A * | 9/1997 | Okano | 349/66 |
| 2001/0053074 A1 | 12/2001 | Onishi et al. | |
| 2003/0076669 A1 | 4/2003 | Itoh et al. | |
| 2003/0137821 A1 | 7/2003 | Gotoh et al. | |
| 2005/0094295 A1 | 5/2005 | Yamashita et al. | |
| 2007/0165419 A1 | 7/2007 | Horiuchi et al. | |
| 2008/0068858 A1 * | 3/2008 | Yamamoto et al. | 362/606 |

FOREIGN PATENT DOCUMENTS

| | | |
|---|---|---|
| JP | 6-18879 A | 1/1994 |
| JP | 2002-15611 A | 1/2002 |
| JP | 2002-42528 A | 2/2002 |
| JP | 2003-132722 A | 5/2003 |
| JP | 2003-302508 A | 10/2003 |
| JP | 2005-243522 A | 9/2005 |
| JP | 2005-259361 A | 9/2005 |
| JP | 2006-128163 A | 5/2006 |
| JP | 2007-25709 A | 2/2007 |
| JP | 2007-156119 A | 6/2007 |
| WO | WO-2006/112325 A1 | 10/2006 |

* cited by examiner

*Primary Examiner* — Laura Tso
(74) *Attorney, Agent, or Firm* — Birch, Stewart, Kolasch & Birch, LLP

(57) ABSTRACT

The light from a light source (4) using an LED enters a light entrance surface (2c) of a light guide plate (2) which is integrated with an microprism array sheet (3). A diffusion film (7) for diffusing light is bonded to a top surface (2b) of the light guide plate (2) in a region near the light source (4).

19 Claims, 14 Drawing Sheets

; # BACKLIGHT

TECHNICAL FIELD

The present invention relates to a backlight that is built in a liquid crystal display apparatus.

BACKGROUND ART

To secure brightness evenness on a display surface of a liquid crystal display apparatus, a backlight built in the liquid crystal display apparatus is strongly required to have brightness evenness for the entire surface of a light emitting surface (active area) that shines a liquid crystal panel. Because of this, in a backlight, conventionally, brightness evenness required for an active area is secured by complicatedly combining a plurality of sheets.

In a method for using several kinds of sheets, because a structure in accordance with use is possible, the degree of freedom of the structure is high; however, because of a large number of sheets and kinds of them, there are problems of complicated designing for securing evenness, much assembly manpower and high cost. To improve these, several methods are proposed as methods that reduce the number of sheets.

For example, a backlight of a reversed-prism type in which uses a prism sheet on one surface of which a prism train is formed with the prism sheet faced with a light-guide plate side is disclosed in a patent document 1 and a patent document 2. Besides, a backlight that has a structure in which a micro-prism array sheet and a light guide plate are unitarily formed with each other is disclosed in a patent document 3 and a patent document 4.

[patent document 1]: JP-A-1994-18879
[patent document 2]: JP-A-2003-302508
[patent document 3]: JP-A-2002-15611
[patent document 4]: JP-A-2002-42528

DISCLOSURE OF THE INVENTION

Problems to be Solved by the Invention

According to the above conventional backlights, although it is possible to reduce the number of sheets, a cold-cathode tube that evenly emits light in a horizontal direction is used as a light source. For thickness reduction, light weight and energy saving of a liquid crystal display apparatus, it is desirable to use a LED (light emitting diode) rather than a cold-cathode tube.

As a light source that uses a LED, a light source in which a plurality of LEDs are arranged on a base body is conventionally used; however, because the LED is a point light source, light-emission unevenness in a horizontal direction easily occurs. And, in a case where such a light source is applied to a backlight of the above reversed-prism type and a backlight that has a structure in which a micro-prism array sheet and a light guide plate are unitarily formed with each other, light diffusion runs short, brightness unevenness occurs in a region of an active area near a light-source side, thereby adversely affecting the display quality of a liquid crystal display apparatus, losing utility value of the backlight.

In light of the above problems, it is an object of the present invention to provide a backlight that uses a LED for a light source, reduces the number of sheets and cost, and does not lose utility value of the backlight.

Means for Solving the Problem

To achieve the above object, a backlight according to the present invention has a structure that includes:

a light source that includes a base body that extends in a longitudinal direction, and a plurality of LEDs arranged away from each other on a surface of the base body in the longitudinal direction;

a light guide plate into an end surface of which light is input from the light source;

a micro-prism array sheet that is a transparent sheet on one surface of which a plurality of small prisms are formed, is unitarily formed with the light guide plate with the prisms faced with a side of the light guide plate, receives light from the light guide plate and outputs the light to a liquid crystal panel;

a first reflection sheet that is arranged on a surface side of the light guide plate opposite to the surface of the light guide plate on which the micro-prism array sheet is disposed;

a diffusion film that is disposed on a surface, in the vicinity of the light source, of the surface of the light guide plate on which the micro-prism array sheet is disposed and diffuses light; and a second reflection sheet that is arranged to cover the diffusion film.

According to such structure, although the LED is used for the light source, it is possible to reduce the number of sheets and cost by using the micro-prism array sheet, curb brightness unevenness in a region of an active area in the vicinity of a light input portion by using light diffusion by the diffusion film, and utility value of the backlight is not lost.

Besides, in the backlight having the above structure according to the present invention, it is desirable to employ a structure in which the light source includes a resin portion which is arranged to cover the plurality of LEDs; and in the longitudinal direction, a surface of the resin portion opposite to the base body side includes a recessed portion between the LEDs adjacent to each other in the longitudinal direction. According to this, because light that propagates through the resin portion in the longitudinal direction is received as output light from the recessed portion, it is possible to raise brightness between the adjacent LEDs where brightness easily becomes low and achieve excellent evenness of light-emission intensity distribution in the light-source longitudinal direction. And, it is possible to further curb brightness unevenness in the active area.

Besides, in the backlight having the above structure according to the present invention, it is desirable to employ a structure in which the small prism is substantially a trapezoidal rotator and its arrangement density becomes dense as the prism goes away from the light source. According to this, it is possible to further curb brightness unevenness in the active area.

Besides, in the backlight having the above structure according to the present invention, the diffusion film may be a resin transparent film in which opaque beads are irregularly scattered and contained.

Besides, the diffusion film may have a structure in which in a resin transparent film, resin transparent particles having a refractive index different from the transparent film are irregularly scattered. According to this, light received into the transparent film reverberates and passes through the transparent particles, so that it is diffused; and because the light that passes through the transparent particles in the diffusion film is present, there are effects that it is possible to curb glare in a front direction and improve the display quality.

Besides, in the backlight having the above structure according to the present invention, it is desirable to include a third reflection sheet which is disposed on the first reflection sheet and on a reflection surface of which the light source and part of the light guide plate near a side of the light source are placed. According to this, it is possible to prevent a positional deviation between the light source and the light guide plate and secure light input from the light source into the light guide plate. Besides, by reflecting light from the light source and the light guide plate and returning the light to the light guide plate, it is also possible to raise utility efficiency of light.

Besides, to achieve the above object, a backlight according to the present invention has a structure that includes:

a light source that includes a base body that extends in a longitudinal direction, and a plurality of LEDs arranged away from each other on a surface of the base body in the longitudinal direction;

a light guide plate into an end surface of which light is input from the light source;

a micro-prism array sheet that is a transparent sheet on one surface of which a plurality of small prisms are formed, is unitarily formed with the light guide plate with the prisms faced with a side of the light guide plate, receives light from the light guide plate and outputs the light to a liquid crystal panel;

a first reflection sheet that is arranged on a surface side of the light guide plate opposite to the surface of the light guide plate on which the micro-prism array sheet is disposed;

wherein a first diffusion pattern is disposed in a portion of the light guide plate that is in the vicinity of the light source and near a side of the micro-prism array sheet, and a second diffusion pattern is disposed in a portion of the light guide plate that is in the vicinity of the light source and near a side of the first reflection sheet; and a second reflection sheet that is arranged to cover the first diffusion pattern is further comprised.

According to such structure, although the LED is used for the light source, it is possible to reduce the number of sheets and cost by using the micro-prism array sheet, curb brightness unevenness in a region in the vicinity of a light input portion of an active area by using light diffusion by the diffusion pattern, and utility value of the backlight is not lost.

Besides, in the backlight having the above structure according to the present invention, it is desirable that the first diffusion pattern and the second diffusion pattern are inclined such that a distance between them becomes long to a thickness of the light guide plate as they go away from the light source side. According to this, it becomes possible to transmit light from an end portion of the first diffusion pattern located on the surface of the light guide plate to the micro-prism array sheet and widen the active area.

Besides, in the backlight having the above structure according to the present invention, it is desirable to employ a structure in which the light source includes a resin portion which is arranged to cover the plurality of LEDs; and in the longitudinal direction, a surface of the resin portion opposite to the base body side includes a recessed portion between the LEDs adjacent to each other in the longitudinal direction. According to this, because light that propagates through the resin portion in the longitudinal direction is received as output light from the recessed portion, it is possible to raise brightness between the adjacent LEDs where the brightness easily becomes low and achieve excellent evenness of light-emission intensity distribution in the light-source longitudinal direction. And, it is possible to further curb brightness unevenness in the active area.

Besides, in the backlight having the above structure according to the present invention, it is desirable to include a third reflection sheet which is disposed on the first reflection sheet and on a reflection surface of which the light source and part of the light guide plate near a side of the light source are placed. According to this, it is possible to prevent a positional deviation between the light source and the light guide plate and secure light input from the light source into the light guide plate. Besides, by reflecting light from the light source and the light guide plate and returning the light to the light guide plate, it is possible to raise utility efficiency of light.

Besides, to achieve the above object, a backlight according to the present invention has a structure that includes:

a light source that includes a base body that extends in a longitudinal direction, and a plurality of LEDs arranged away from each other on a surface of the base body in the longitudinal direction;

a light guide plate into an end surface of which light is input from the light source and a prism train is formed on both surfaces of a portion far from a side of the light input;

a prism sheet that is a transparent sheet on one surface of which a prism train is formed, and the prism train is arranged on one prism train of the light guide plate with the prism train faced with a side of the light guide plate;

a first reflection sheet that is arranged on a surface side of the light guide plate opposite to the surface of the light guide plate on which the prism sheet is disposed;

a diffusion film that is disposed on a surface, in the vicinity of the light source, of the surface of the light guide plate on which the prism sheet is disposed and diffuses light; and a second reflection sheet that is arranged to cover the diffusion film.

According to such structure, although the LED is used for the light source, it is possible to reduce the number of sheets and cost by using the prism sheet, curb brightness unevenness in a region in the vicinity of a light input portion of an active area by using light diffusion by the diffusion film, and utility value of the backlight is not lost.

Besides, in the backlight having the above structure according to the present invention, it is desirable to employ a structure in which the light source includes a resin portion which is arranged to cover the plurality of LEDs; and in the longitudinal direction, a surface of the resin portion opposite to a side of the base body includes a recessed portion between the LEDs adjacent to each other in the longitudinal direction. According to this, because light that propagates through the resin portion in the longitudinal direction is received as output light from the recessed portion, it is possible to raise brightness between the adjacent LEDs where the brightness easily becomes low and achieve excellent evenness of light-emission intensity distribution in the light-source longitudinal direction. And, it is possible to further curb brightness unevenness in the active area.

Besides, in the backlight having the above structure according to the present invention, the diffusion film may be a resin transparent film in which opaque beads are irregularly scattered and contained.

Besides, the diffusion film may have a structure in which in a resin transparent film, resin transparent particles having a refractive index different from the transparent film are irregularly scattered. According to this, light received into the transparent film reverberates and passes through the transparent particles, so that it is diffused; and because light that passes through the transparent particles in the diffusion film is present, there are effects that glare in a front direction is curbed and the display quality is improved.

Besides, in the backlight having the above structure according to the present invention, it is desirable to include a third reflection sheet which is disposed on the first reflection sheet and on a reflection surface of which the light source and part of the light guide plate near a side of the light source are placed. According to this, it is possible to prevent a positional deviation between the light source and the light guide plate and secure light input from the light source into the light guide plate. Besides, by reflecting light from the light source and the light guide plate and returning the light to the light guide plate, it is possible to raise utility efficiency of light.

Besides, to achieve the above object, a backlight according to the present invention has a structure that includes:

a light source that includes a base body that extends in a longitudinal direction, and a plurality of LEDs arranged away from each other on a surface of the base body in the longitudinal direction;

a light guide plate into an end surface of which light is input from the light source and a prism train is formed on both surfaces of a portion far from a side of the light input;

a prism sheet that is a transparent sheet on one surface of which a prism train is formed, and the prism train is arranged on one prism train of the light guide plate with the prism train faced with a side of the light guide plate;

a first reflection sheet that is arranged on a surface side of the light guide plate opposite to the surface of the light guide plate on which the prism sheet is disposed;

wherein a first diffusion pattern is disposed in a portion of the light guide plate that is in the vicinity of the light source and near a side of the prism sheet, and a second diffusion pattern is disposed in a portion of the light guide plate that is in the vicinity of the light source and near a side of the first reflection sheet; and a second reflection sheet that is arranged to cover the first diffusion pattern is further comprised.

According to such structure, although the LED is used for the light source, it is possible to reduce the number of sheets and cost by using the prism sheet, curb brightness unevenness in a region in the vicinity of a light input portion of an active area by using light diffusion by the diffusion pattern, and utility value of the backlight is not lost.

Besides, in the backlight having the above structure according to the present invention, it is desirable that the first diffusion pattern and the second diffusion pattern are inclined such that the distance between them becomes long to a thickness of the light guide plate as they go away from a side of the light source. According to this, it becomes possible to transmit light from an end portion of the first diffusion pattern located on the surface of the light guide plate to the prism sheet and widen the active area.

Besides, in the backlight having the above structure according to the present invention, it is desirable to employ a structure in which the light source includes a resin portion which is arranged to cover the plurality of LEDs; and in the longitudinal direction, a surface of the resin portion opposite to a side of the base body includes a recessed portion between the LEDs adjacent to each other in the longitudinal direction. According to this, because light that propagates through the resin portion in the longitudinal direction is received as output light from the recessed portion, it is possible to raise brightness between the adjacent LEDs where the brightness easily becomes low and achieve excellent evenness of light-emission intensity distribution in the light-source longitudinal direction. And, it is possible to further curb brightness unevenness in the active area.

Besides, in the backlight having the above structure according to the present invention, it is desirable to include a third reflection sheet which is disposed on the first reflection sheet and on a reflection surface of which the light source and part of the light guide plate near a side of the light source are placed. According to this, it is possible to prevent a positional deviation between the light source and the light guide plate and secure light input from the light source into the light guide plate. Besides, by reflecting light from the light source and the light guide plate and returning the light to the light guide plate, it is possible to raise utility efficiency of light.

Advantages of the Invention

According to the present invention, in a backlight, a LED is used for a light source, the number of sheets is reduced, cost is reduced and utility value of the backlight is not lost.

Figure 1:
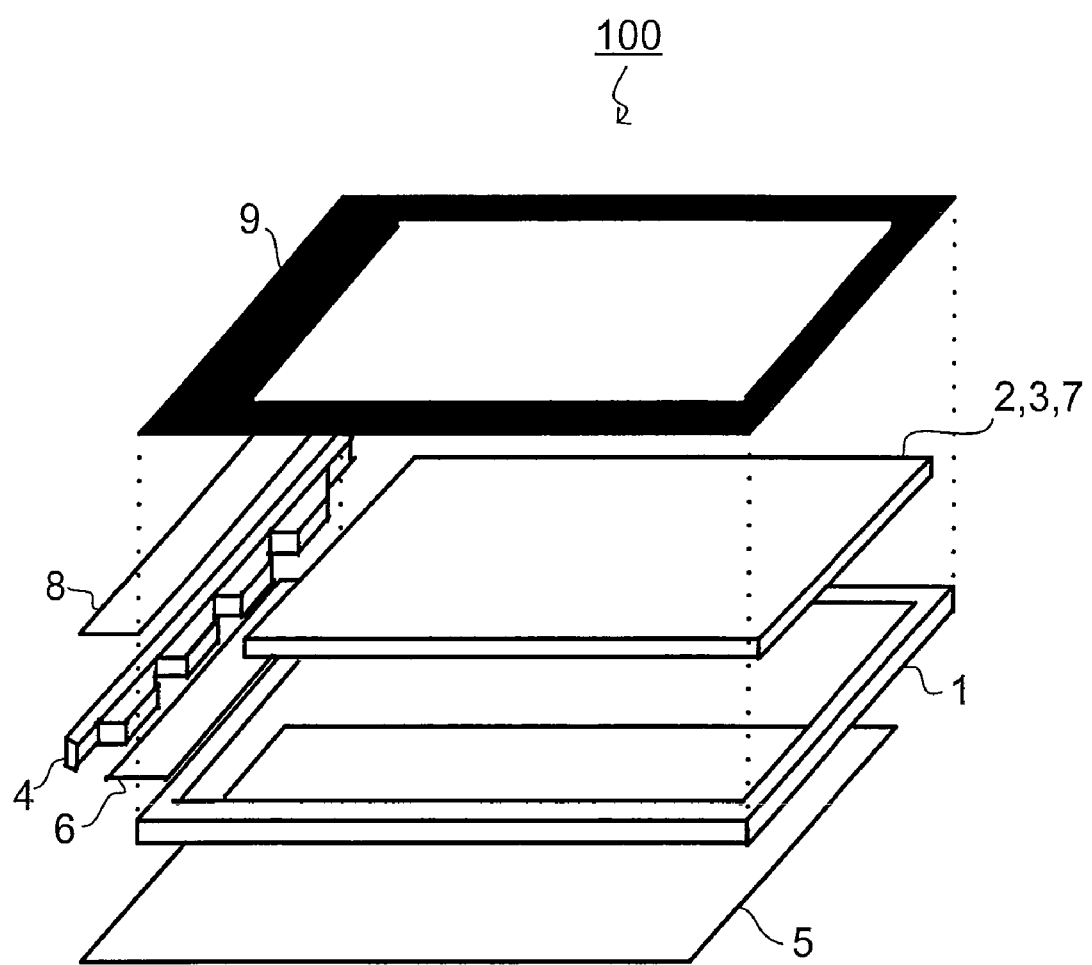
FIG. 1 is an exploded perspective view of a backlight according to a first embodiment of the present invention.

LIST OF REFERENCE SYMBOLS 100 backlight according to first embodiment of the present invention
1 frame
2 light guide plate
3 MPA sheet
4 light source
5 reflection sheet
6 lower reflection sheet
7 diffusion film
8 upper reflection sheet
9 light-block double-coated tape
200 backlight according to second embodiment of the present invention 10 frame
11 light guide plate
12 MPA sheet
13 light source
14 reflection sheet
15 lower reflection sheet
16 upper reflection sheet
17 light-block double-coated tape
300 backlight according to third embodiment of the present invention
18 frame
19 light guide plate
20 diffusion film
21 light source
22 reflection sheet
23 lower reflection sheet
24 upper reflection sheet
25 prism sheet
26 light-block double-coated tape
400 backlight according to fourth embodiment of the present invention
27 frame
28 light guide plate
29 light source
30 reflection sheet
31 lower reflection sheet
32 upper reflection sheet
33 prism sheet
34 light-block double-coated tape

BEST MODE FOR CARRYING OUT THE INVENTION

Hereinafter, embodiments of the present invention are described with reference to the drawings.

First Embodiment

Figure 2:
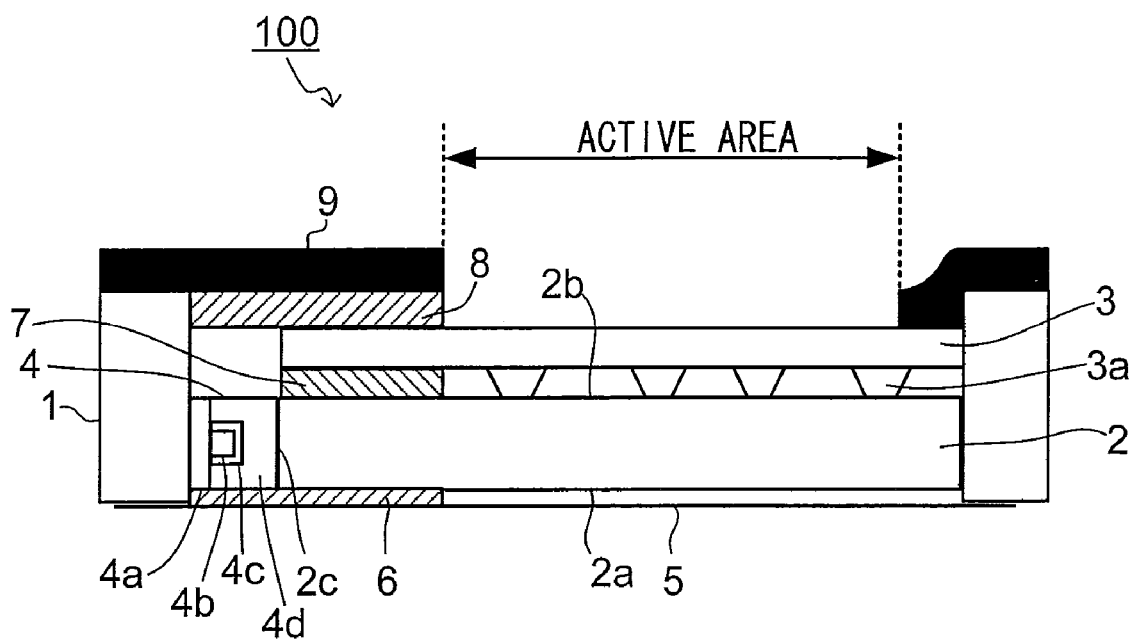
FIG. 2 is a sectional view of the backlight according to the first embodiment of the present invention.

In FIG. 1, an exploded perspective view of a backlight 100 according to a first embodiment of the present invention is shown. Besides, in FIG. 2, a sectional view of the backlight 100 according to the first embodiment of the present invention is shown.

As shown in the figures, the backlight 100 according to the first embodiment of the present invention includes: a frame 1; a light guide plate 2; a micro-prism array sheet (hereinafter, MPA sheet) 3; a light source 4; a reflection sheet 5; a lower reflection sheet 6; a diffusion film 7; an upper reflection sheet 8; and a light-block double-coated tape 9. Here, in FIG. 1, the light guide plate 2, the MPA sheet 3, and the diffusion film 7 are simply shown as a rectangular body shape member.

The frame 1 has a shape that encloses the outer circumference of substantially a rectangular body shape opening portion and is a resin-formed member. In the opening portion of the frame 1, the lower reflection sheet 6, the light source 4, the light guide plate 2, the MPA sheet 3, the diffusion film 7 and the upper reflection sheet 8 are housed.

The frame 1 is placed on the reflection sheet 5. Besides, the lower reflection sheet 6 is adhered on the reflection sheet 5 to come into contact with a lower edge of the opening portion of the frame 1. And, the light source 4 and part of the light guide plate 2 are placed on the lower reflection sheet 6.

Figure 3A:
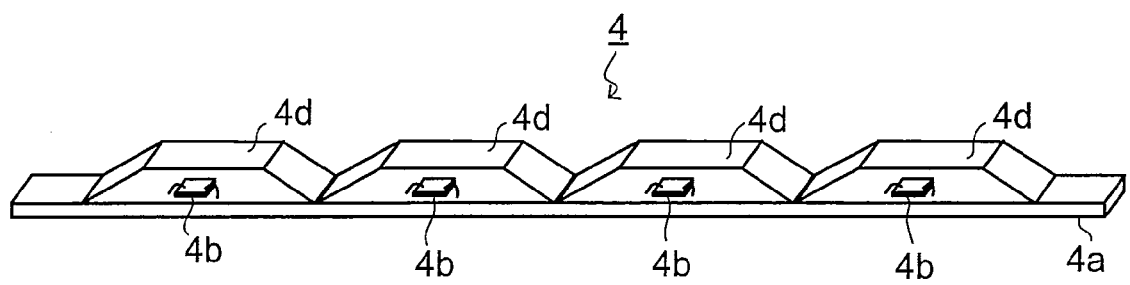
FIG. 3A is a perspective view of a light source that the backlight according to the first embodiment of the present invention includes.
Figure 3B:
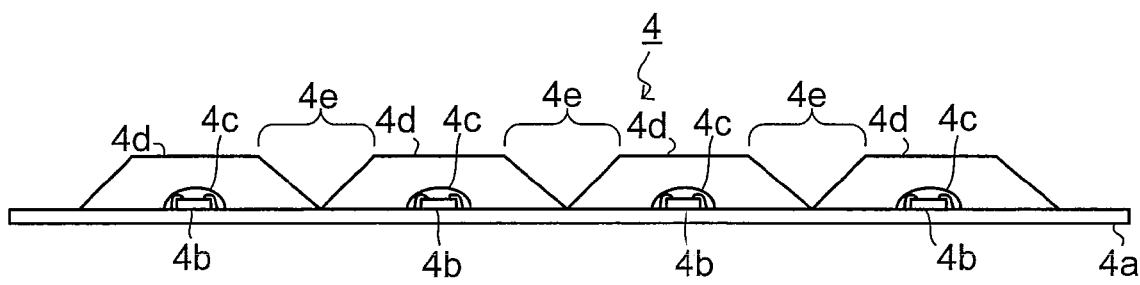
FIG. 3B is a longitudinal-direction sectional view of the light source of the backlight according to the first embodiment of the present invention.

Here, the light source 4 is described in detail. In FIG. 3A, a perspective view of the light source 4 is shown, and in FIG. 3B, a longitudinal-direction sectional view of the light source 4 is shown.

As shown in the figures, the light source 4 includes: a printed board 4a; a plurality of LEDs 4b that emit blue light; a light-transmissive resin-packaged layer 4c that contains a fluorescent material; and a light-transmissive resin-packaged layer 4d that does not contain a fluorescent material.

The printed board 4a has an elongate strip shape and a wiring pattern is formed on the printed board 4a. And, the LEDs 4b are arranged away from each other in a longitudinal direction of the printed board 4a; each LED 4b is connected with the wiring of the printed board 4a by a wire and each LED 4b is electrically connected in series. On the printed board 4a, a positive electrode terminal and a negative electrode terminal (any not shown) are formed as end portions of a series circuit; and a voltage is applied across the terminals, so that each LED 4b emits light.

Besides, the resin-packaged layer 4c is, for example, a silicone resin in which yellow fluorescent materials are dispersed as fluorescent materials, and is formed to cover each LED 4b. The yellow fluorescent material absorbs blue light emitted from the LED 4b to be excited and emits yellow light; and the blue light and the yellow light mix with each other, so that white light is emitted.

Besides, the resin-packaged layer 4d is formed into substantially a trapezoidal-pole shape to cover each resin-packaged layer 4c and is formed of a silicone resin, for example. Substantially a V-shaped recessed portion 4e in section is formed by surfaces that are part of a surface opposite to the printed board 4a, included by the adjacent resin-packaged layers 4d and correspond to oblique edges that connect an upper edge and a lower edge of a trapezoid. This recess portion 4e is formed between the adjacent LEDs 4b.

Because light that is emitted from the light source portion including the LED 4b and the resin-packaged layer 4c and propagates through the resin-packaged layer 4d in the longitudinal direction is received as output light from the recessed portion 4e, it is possible to raise brightness between the adjacent LEDs where the brightness easily becomes low and achieve excellent evenness of light-emission intensity distribution in the light-source 4 longitudinal direction.

Back again to the description of the structure of the backlight 100. The light guide plate 2 is substantially a rectangular body member that includes a side surface, a bottom surface 2a and a top surface 2b which are situated to sandwich this side surface and is formed of a resin such as an acryl resin or the like. The bottom surface 2a and the top surface 2b are mirror-surfaced. And, a light input surface 2c that is a surface of the side surfaces of the light guide plate 2 faces each resin-packaged layer 4d of the light source 4, and light emitted from the light source 4 enters the light guide plate 2 from the light input surface 2c.

The light source 4 and the light input portion of the light guide plate 2 are placed on the lower reflection sheet 6, so that it is possible to prevent a positional deviation between the light source 4 and the light guide plate 2 and secure the light input from the light source 4 into the light guide plate 2. Besides, a reflection surface of the lower reflection sheet 6 faces sides of the light source 4 and the light guide plate 2; and the lower reflection sheet 6 has also a role in reflecting light from the light source 4 and leakage light from the bottom surface 2a of the light guide plate 2 to make them enter the light guide plate 2, and raising utility efficiency of light. Besides, a reflection surface of the reflection sheet 5 faces a side of the light guide plate 2; and the reflection sheet 5 has a role in reflecting leakage light from the bottom surface 2a of the light guide plate 2 to make it enter the light guide plate 2, and raising utility efficiency of light.

Figure 4:
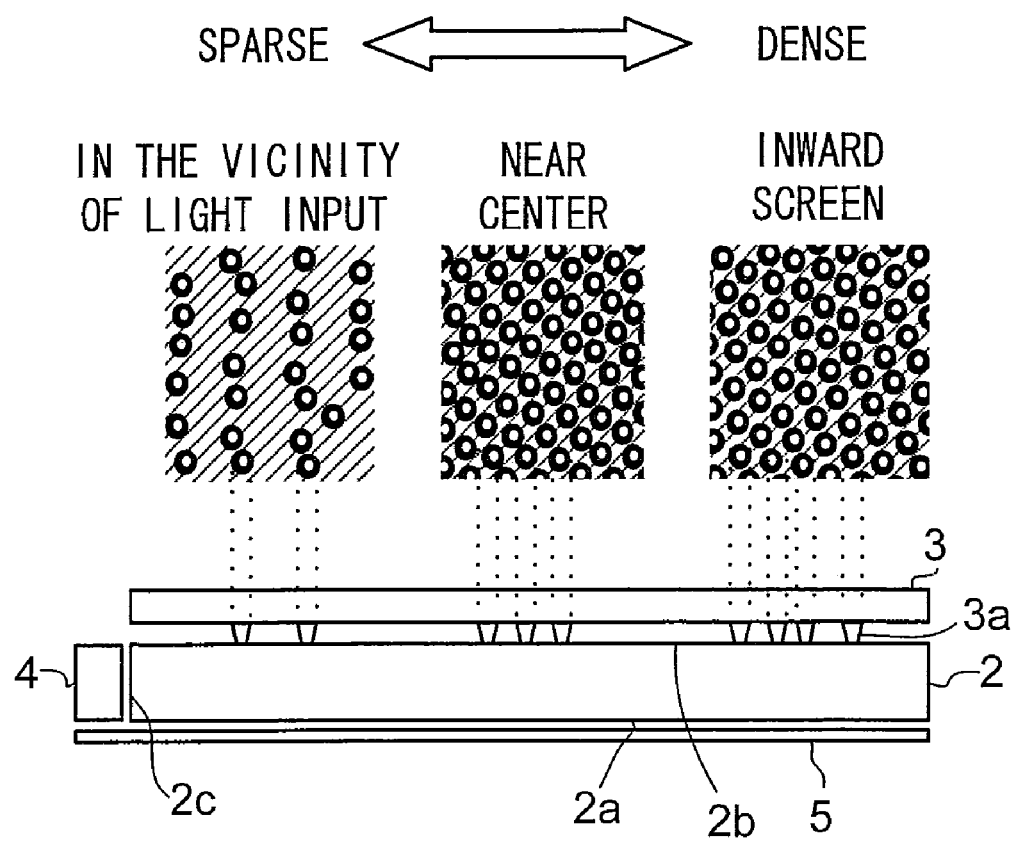
FIG. 4 is a diagram showing an arrangement density of prisms on a MPA sheet

Besides, the MPA sheet 3 is unitarily formed with the light guide plate 2. The MPA sheet 3 is a transparent sheet on one surface of which many small prisms 3a each having substantially a trapezoidal rotator shape are formed and has the same refractive index as that of the light guide plate 2. And, each prism 3a is adhered on the top surface 2b by an adhesive coated on the entire top surface 2b of the light guide plate 2, so that the MPA sheet 3 and the light guide plate 2 are formed unitarily with each other. Here, the refractive index of the adhesive is the same as the refractive index of the light guide plate 2. Light that enters the light guide plate 2 from the light input surface 2c of the light guide plate 2c is received by the prism 3a from the top surface 2b and the advance direction is changed into a normal direction of the top surface 2b by total reflection at the prism 3a, and output from the MPA sheet 3 to a liquid crystal panel (not shown). Besides, as shown in FIG. 4, a structure is employed, in which the arrangement density of the prism 3a on the MPA sheet 3 becomes dense as the prism 3a goes away from the side of the light source 4. According to this, brightness evenness in an active area (the light emitting surface of the backlight) is achieved.

Besides, the diffusion film 7 is adhered by an adhesive onto a region of the top surface 2b of the light guide plate 2 in the vicinity of the light source 4, and the diffusion film 7 is situated by being sandwiched by the light guide plate 2 and the MPA sheet 3. Light input from the light source 4 into the light guide plate 2 via the light input surface 2c is diffused by the diffusion film 7.

The diffusion film 7 may be, for example, a resin transparent film in which opaque beads are irregularly scattered and contained. Here, it is desirable that the transparent film has the same refractive index as the light guide plate 2 in terms of receiving light into the diffusion sheet 7.

Besides, the diffusion film 7 may have a structure in which in a resin transparent film, resin transparent particles that have a refractive index different from that of the transparent film are irregularly scattered (it is desirable that the transparent film has the same refractive index as the light guide plate 2 like in the above description). According to this, light received into the transparent film reverberates and passes through the transparent particles, so that it is diffused; and because light that passes through the transparent particles in the diffusion film is present, there are effects that it is possible to curb glare in the front direction and improve the display quality.

Besides, the upper reflection sheet 8 is placed on the MPA sheet 3 to cover upper portions of the diffusion film 7 and the light source 4. A reflection surface of the upper reflection sheet 8 faces a side of the MPA sheet 3; and the upper reflection sheet 8 has a role in reflecting light that passes through the diffusion film 7 to return it to the light guide plate 2, and raising utility efficiency of light.

And, one surface of the light-block double-coated tape 9 which has such a shape that encloses the circumference of substantially the rectangular-shape opening is adhered on the entire upper surface of the frame 1, part of an edge portion of the upper surface of the MPA sheet 3 and the entire upper surface of the upper reflection sheet 8. And, a liquid crystal panel (not shown) is adhered on the other surface of the light-block double-coated tape 9. The opening portion of the light-block double-coated tape 9 serves as an active area, and light emitted from the active area illuminates the liquid crystal panel.

As described above, in the backlight 100 according to the first embodiment of the present invention, although it is a structure which reduces the number of sheets by using the MPA sheet 3, it is possible to curb brightness unevenness in the region of the active area in the vicinity of the light input portion by using the light source 4 that is excellent in the evenness of the light emission intensity distribution in the longitudinal direction and by using the diffusion film 7 disposed at the light input portion. In other words, in the backlight 100 according to the first embodiment of the present invention, by using the LED for the light source, it is possible to obtain effects of reductions in the number of sheets, a designing span, assembly manpower and cost; and utility value of the backlight is not lost.

Second Embodiment

Figure 5:
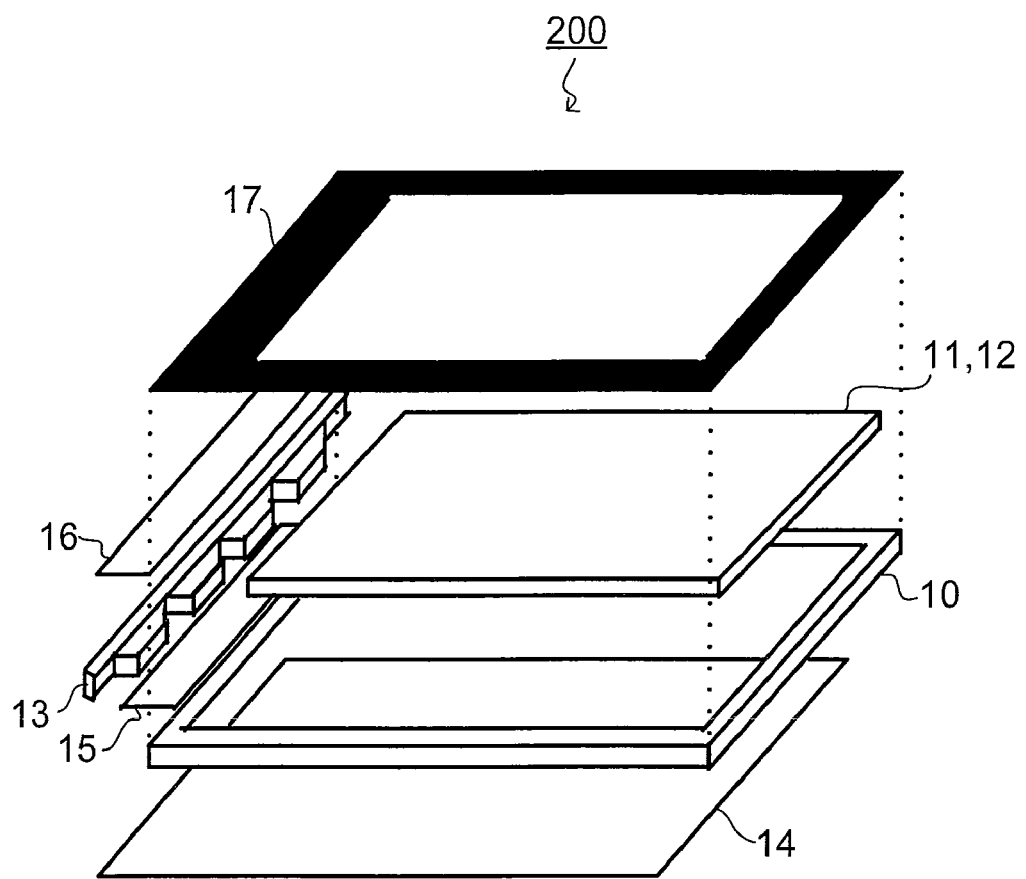
FIG. 5 is an exploded perspective view of a backlight according to a second embodiment of the present invention.
Figure 6:
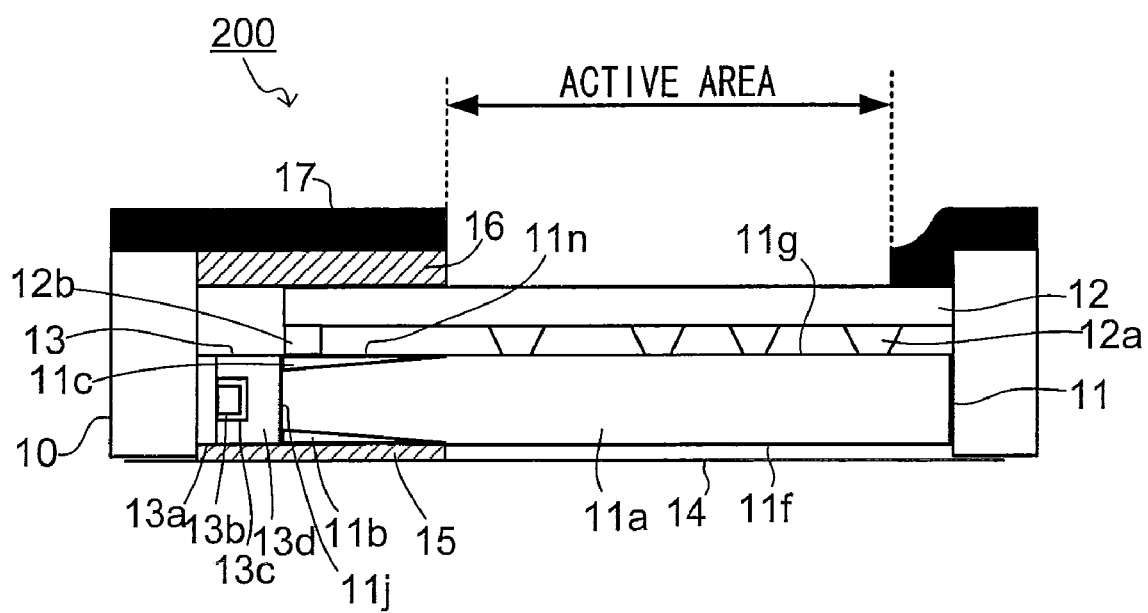
FIG. 6 is a sectional view of the backlight according to the second embodiment of the present invention.

In FIG. 5, an exploded perspective view of a backlight 200 according to a second embodiment of the present invention is shown. Besides, in FIG. 6, a sectional view of the backlight 200 according to the second embodiment of the present invention is shown.

As shown in the figures, the backlight 200 according to the second embodiment of the present invention includes: a frame 10; a light guide plate 11; a MPA sheet 12; a light source 13; a reflection sheet 14; a lower reflection sheet 15; an upper reflection sheet 16; and a light-block double-coated tape 17. Here, in FIG. 5, the light guide plate 11, the MPA sheet 12 are simply shown as a rectangular body shape member.

The frame 10 has a shape that encloses the outer circumference of substantially a rectangular body shape opening portion and is a resin-formed member. In the opening portion of the frame 10, the lower reflection sheet 15, the light source 13, the light guide plate 11, the MPA sheet 12, and the upper reflection sheet 16 are housed.

The frame 10 is placed on the reflection sheet 14. Besides, the lower reflection sheet 15 is adhered on the reflection sheet 14 to come into contact with a lower edge of the opening portion of the frame 10. And, the light source 13 and part of the light guide plate 11 are placed on the lower reflection sheet 15.

The light source 13 includes: a printed board 13a; a plurality of LEDs 13b; a plurality of resin-packaged layers 13c; and a plurality of resin-packaged layers 13d; the structure is the same as the light source 4 described in the first embodiment and excellent in evenness of light emission intensity distribution in the longitudinal direction.

Figure 7:
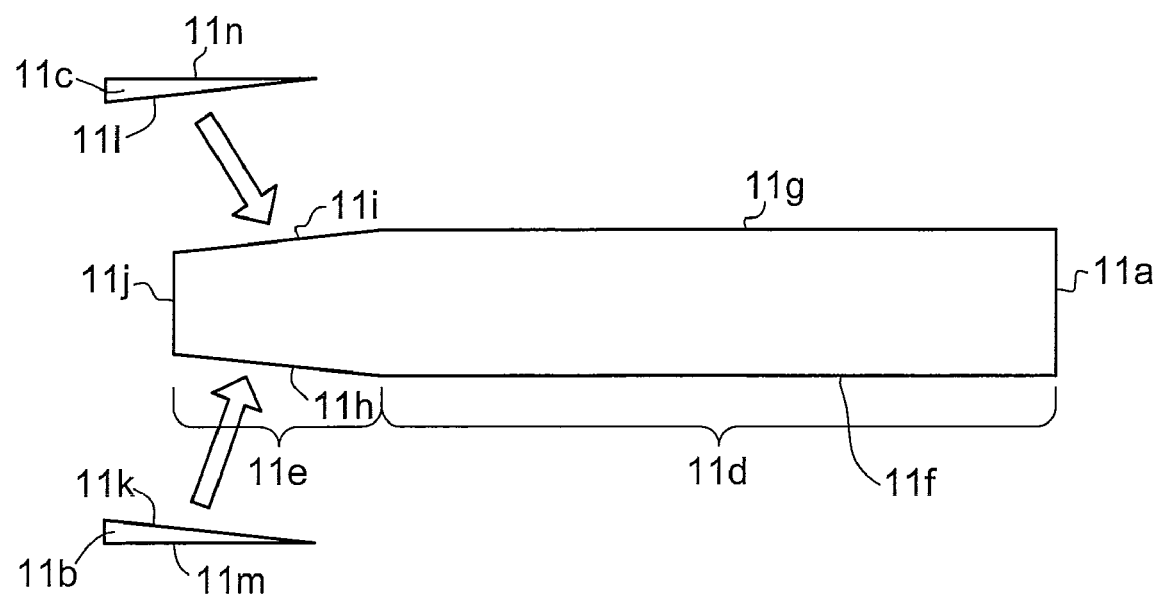
FIG. 7 is a diagram showing assembly of a light guide plate that the backlight according to the second embodiment of the present invention includes.

Next, the light guide plate 11 is described. In FIG. 7, assembly of the light guide plate 11 is shown. The light guide plate 11 is composed of: a main body portion 11a; a subsidiary portion 11b; and a subsidiary portion 11c. The main body portion 11a is formed of a resin such as an acryl resin or the like and includes: substantially a rectangular body portion 11d; and a tapered portion 11e that is formed on one end of the rectangular body portion 11d such that the thickness becomes small as it goes to the tip end. A bottom surface 11f and a top surface 11g of the rectangular body portion 11d are mirror-surfaced. Uneven surfaces 11h, 11i are formed on two tapered surfaces of the tapered portion 11e by knurling.

Besides, the subsidiary portion 11b and the subsidiary portion 11c are formed of the same resin as that of the main body portion 11a and have a triangle-pole shape that is substantially right triangle in section. An uneven surface 11k is formed on an inclined surface of the subsidiary portion 11b by knurling, while an uneven surface 11l is formed on an inclined surface of the subsidiary portion 11c by knurling. Besides, a surface 11m of the subsidiary portion 11b other than the inclined surface and a surface 11n of the subsidiary portion 11c other than the inclined surface are mirror-surfaced.

And, the uneven surface 11k of the subsidiary portion 11b and the uneven surface 11h of the tapered portion 11e are joined to each other by thermal treatment or the like; the uneven surface 11l of the subsidiary portion 11c and the uneven surface 11i of the tapered portion 11e are joined to each other by thermal treatment or the like; the main body portion 11a, the subsidiary portion 11b and the subsidiary portion 11c are unitarily formed with each other, so that substantially the rectangular-shape light guide plate 11 is formed. Here, the uneven surfaces 11h, 11i, 11k and 11l may be uneven surfaces formed by machining other than knurling.

And, a light input surface 11j that is an end surface of the main body portion 11a of the light guide plate 11 faces each resin-packaged layer 13d of the light source 13; and light emitted from the light source 13 enters the light guide plate 11 from the light input surface 11j. A small amount of air is contained in the joint surface between the main body portion 11a and the subsidiary portion 11b of the light guide plate 11 and in the joint surface between the main body portion 11a and the subsidiary portion 11c; and light that enters from the light input surface 11j is reflected and diffused by each joint surface.

Besides, the light source 13 and the light input portion (the portion that includes the tapered portion 11e, the subsidiary portion 11b and the subsidiary portion 11c) of the light guide plate 11 are placed on the lower reflection sheet 15, so that it is possible to prevent a positional deviation between the light source 13 and the light guide plate 11 and secure the light input from the light source 13 into the light guide plate 11. Besides, a reflection surface of the lower reflection sheet 15 faces sides of the light source 13 and the light guide plate 11; and the lower reflection sheet 15 has also a role in reflecting light from the light source 13 and leakage light from the subsidiary portion 11b of the light guide plate 11 to make them enter the light guide plate 11, and raising utility efficiency of light. Besides, a reflection surface of the reflection sheet 14 faces a side of the light guide plate 11; and the reflection sheet 14 has a role in reflecting leakage light from the bottom surface 11f of the main body portion 11a of the light guide plate 11 to make it enter the light guide plate 11, and raising utility efficiency of light.

Besides, the MPA sheet 12 is unitarily formed with the light guide plate 11. The MPA sheet 12 is a transparent sheet in which many small prisms 12a each having substantially a trapezoidal rotator shape are formed on one surface of the transparent sheet and substantially a rectangular-shape projection portion 12b is formed on one end of the one surface; and the MPA sheet 12 has the same refractive index as that of the light guide plate 11. And, the projection portion 12b of the MPA sheet 12 and each prism 12a are adhered on the surface 11n and the top surface 11g respectively by an adhesive coated on the surface 11n of the subsidiary portion 11c of the light guide plate 11 and by an adhesive coated on the top surface 11g of the main body portion 11a, so that the MPA sheet 12 and the light guide plate 11 are formed unitarily with each other. Here, the refractive index of the adhesive is the same as the refractive index of the light guide plate 11.

Light that enters the light guide plate 11 from the light input surface 114 of the light guide plate 11 is received by the prism 12a from the top surface 11g and the advance direction is changed into a normal direction of the top surface 11g by total reflection at the prism 12a, and output from the MPA sheet 12 to a liquid crystal panel (not shown). Besides, like in the above description in the first embodiment, a structure is employed, in which the arrangement density of the prism 12a of the MPA sheet 12 becomes dense as the prism 12a goes away from the light source 13 side. According to this, brightness evenness in an active area (the light emitting surface of the backlight) is achieved.

Besides, the upper reflection sheet 16 is placed on the MPA sheet 12 to cover upper portions of the subsidiary portion 11c and the light source 13. A reflection surface of the upper reflection sheet 16 faces a side of the MPA sheet 12; and the upper reflection sheet 16 has a role in reflecting light that passes through the joint surface between the main body portion 11a and the subsidiary 11c of the light guide plate 11 to return it to the light guide plate 11, and raising utility efficiency of light.

And, one surface of the light-block double-coated tape 17 which has such a shape that encloses the circumference of substantially the rectangular-shape opening is adhered on the entire upper surface of the frame 10, part of an edge portion of the upper surface of the MPA sheet 12 and the entire surface of the upper reflection sheet 16. And, a liquid crystal panel (not shown) is adhered on the other surface of the light-block double-coated tape 17. The opening portion of the light-block double-coated tape 17 serves as an active area, and light emitted from the active area illuminates the liquid crystal panel.

As described above, in the backlight 200 according to the second embodiment of the present invention, although it is a structure which reduces the number of sheets by using the MPA sheet 12, it is possible to curb brightness unevenness in the region of the active area in the vicinity of the light input portion by using the light source 13 that is excellent in the evenness of the light emission intensity distribution in the longitudinal direction and by using a diffusion pattern (the joint surface between the main body portion 11a and the subsidiary portion 11b and the joint surface between the main body portion 11a and the subsidiary portion 11c) that is disposed in the light input portion of the light guide plate 11. Besides, because a slope is formed on the diffusion pattern to allow the distance therebetween to become long up to the thickness of the light guide plate 11 as it goes away from the light source 13, it becomes possible to transmit light from an end portion of the diffusion pattern located on the surface of the light guide plate 11 to the MPA sheet 12, so that it is possible to widen the active area. In other words, in the backlight 200 according to the second embodiment of the present invention, by using the LED for the light source, it is possible to obtain effects of reductions in the number of sheets, a designing span, assembly manpower and cost; and utility value of the backlight is not lost.

Third Embodiment

Figure 8:
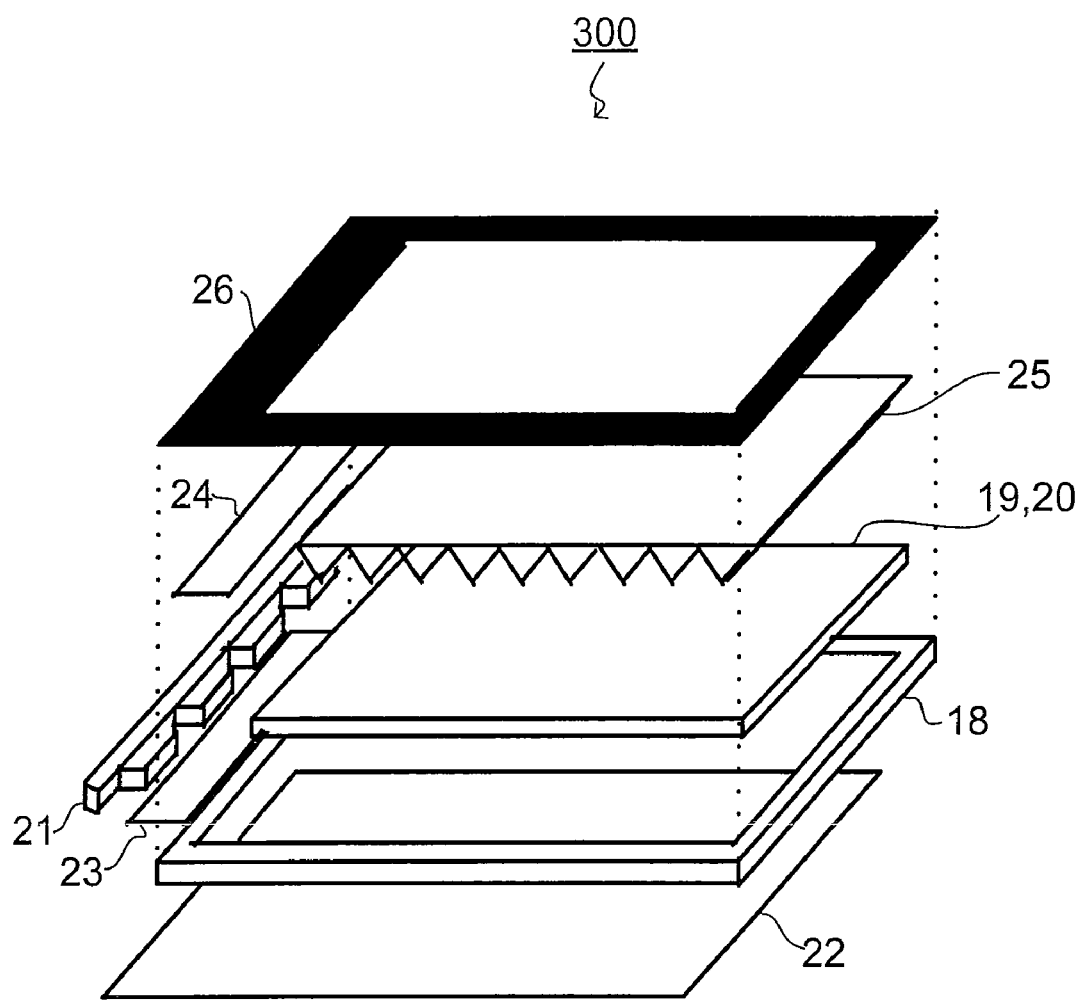
FIG. 8 is an exploded perspective view of a backlight according to a third embodiment of the present invention.
Figure 9:
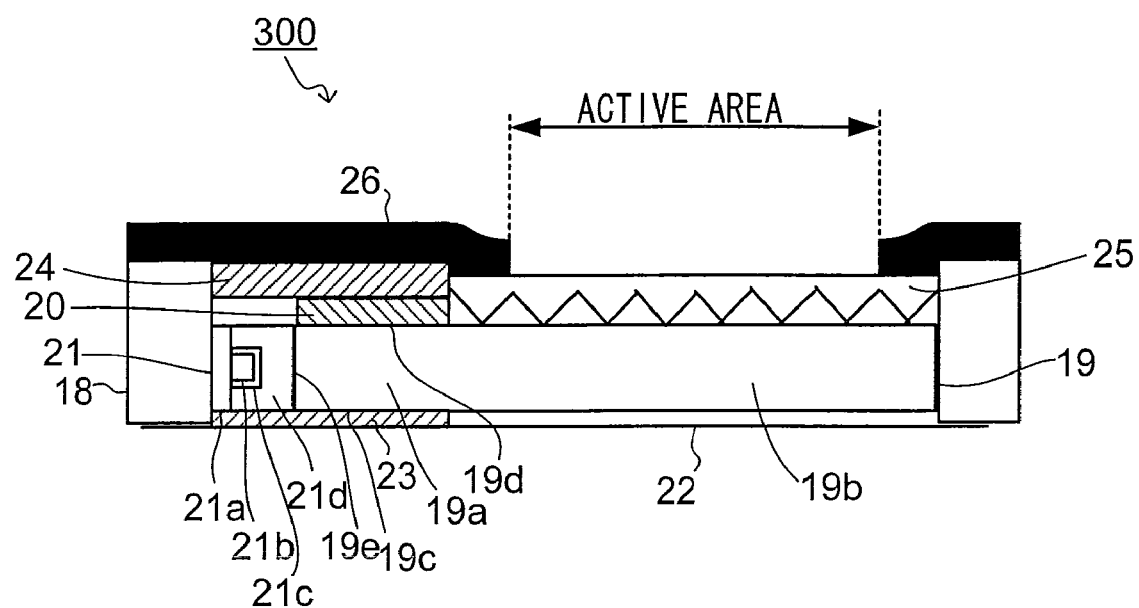
FIG. 9 is a sectional view of the backlight according to the third embodiment of the present invention.

In FIG. 8, an exploded perspective view of a backlight 300 according to a third embodiment of the present invention is shown. Besides, in FIG. 9, a sectional view of the backlight 300 according to the third embodiment of the present invention is shown.

As shown in the figures, the backlight 300 according to the third embodiment of the present invention includes: a frame 18; a light guide plate 19; a diffusion film 20; a light source 21; a reflection sheet 22; a lower reflection sheet 23; an upper reflection sheet 24; a prism sheet 25; and a light-block double-coated tape 26. Here, in FIG. 8, the light guide plate 19, the diffusion film 20 are simply shown as a rectangular body shape member.

The frame 18 has a shape that encloses the outer circumference of substantially a rectangular body shape opening portion and is a resin-formed member. In the opening portion of the frame 18, the lower reflection sheet 23, the light source 21, the light guide plate 19, the diffusion film 20, the upper reflection sheet 24 and the prism sheet 25 are housed.

The frame 18 is placed on the reflection sheet 22. Besides, the lower reflection sheet 23 is adhered on the reflection sheet 22 to come into contact with a lower edge of the opening portion of the frame 18. And, the light source 21 and part of the light guide plate 19 are placed on the lower reflection sheet 23.

The light source 21 includes: a printed board 21a; a plurality of LEDs 21b; a plurality of resin-packaged layers 21c; and a plurality of resin-packaged layers 21d; the structure is the same as the light source 4 described in the first embodiment and excellent in evenness of light emission intensity distribution in the longitudinal direction.

Figure 10:
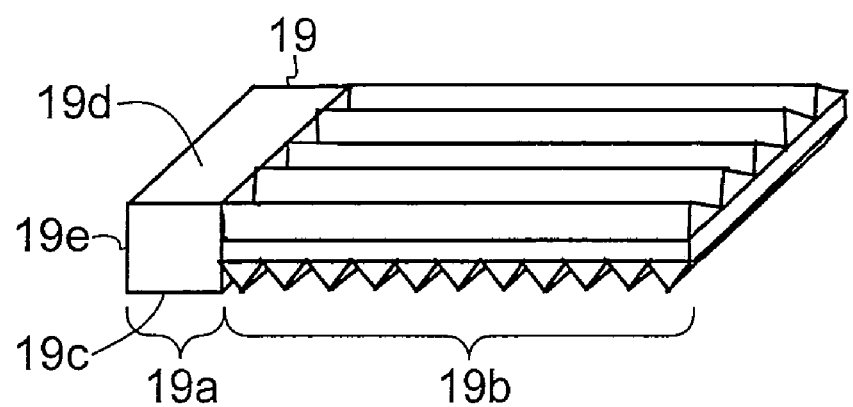
FIG. 10 is a detailed structural diagram of a light guide plate that the backlight according to the third embodiment of the present invention includes.

Next, the light guide plate 19 is described. In FIG. 10, a detailed structural diagram of the light guide plate 19 is shown. The light guide plate 19 includes: substantially a rectangular body portion 19a; and a prism train forming portion 19b on both surfaces of which prism trains substantially perpendicular to each other are formed. A bottom surface 19c and a top surface 19d of the rectangular body portion 19a are mirror-surfaced. And, a light input surface 19e that is a surface of the surfaces of the rectangular body portion 19a faces each resin-packaged layer 21d of the light source 21, and light emitted from the light source 21 enters the light guide plate 19 from the light input surface 19e.

The light source 21 and the light input portion of the light guide plate 19 are placed on the lower reflection sheet 23, so that it is possible to prevent a positional deviation between the light source 21 and the light guide plate 19 and secure the light input from the light source 21 into the light guide plate 19. Besides, a reflection surface of the lower reflection sheet 23 faces sides of the light source 21 and the light guide plate 19; and the lower reflection sheet 23 has also a role in reflecting light from the light source 21 and leakage light from the bottom surface 19c of the rectangular body portion 19a of the light guide plate 19 to make them enter the light guide plate 19, and raising utility efficiency of light. Besides, a reflection surface of the reflection sheet 22 faces a side of the light guide plate 19; and the reflection sheet 22 has a role in reflecting leakage light from the bottom surface-side prism train of the prism train forming portion 19b of the light guide plate 19 to make it enter the light guide plate 19, and raising utility efficiency of light.

Besides, the diffusion film 20 is adhered by an adhesive onto the top surface 19d of the rectangular body portion 19a of the light guide plate 19 (the refractive index of the adhesive is the same as the light guide plate 19). Light input from the light source 21 into the light guide plate 19 via the light input surface 19e is diffused by the diffusion film 20.

The diffusion film 20 may be, for example, a resin transparent film in which opaque beads are irregularly scattered and contained. Here, it is desirable that the transparent film has the same refractive index as the light guide plate 19 in terms of receiving light into the diffusion sheet 20.

Besides, the diffusion film 20 may have a structure in which in a resin transparent film, resin transparent particles that have a refractive index different from that of the transparent film are irregularly scattered (it is desirable that the transparent film has the same refractive index as the light guide plate 19 like in the above description). According to this, light received into the transparent film reverberates and passes through the transparent particles, so that it is diffused; and because light that passes through the transparent particles in the diffusion film is present, there are effects that it is possible to curb glare in the front direction and improve the display quality.

Besides, the upper reflection sheet 24 is placed on the diffusion film 20 to cover upper portions of the diffusion film 20 and the light source 21. A reflection surface of the upper reflection sheet 24 faces a side of the diffusion film 20; and the upper reflection sheet 24 has a role in reflecting light that passes through the diffusion film 20 to return it to the light guide plate 19, and raising utility efficiency of light.

Besides, the prism sheet 25 is a transparent sheet on one surface of which a prism train is formed and placed on a prism train on the top surface side of the prism train forming portion 19b of the light guide plate 19 with the prism train faced with the side of the light guide plate 19. And, one surface of the light-block double-coated tape 26 which has such a shape that encloses the circumference of substantially the rectangular-shape opening is adhered on the entire upper surface of the frame 18, the entire edge portion of the upper surface of the prism sheet 25 and the entire upper surface of the upper reflection sheet 24. And, a liquid crystal panel (not shown) is adhered on the other surface of the light-block double-coated tape 26. Light that is input from the light source 21 into the light guide plate 19 is received by the prism trains formed on both surfaces of the light guide plate 19 from the light guide plate 19 into the prism train of the prism sheet 25; and the received light is output from the prism sheet 25 to the liquid crystal panel by the prism train of the prism sheet 25. The opening portion of the light-block double-coated tape 26 serves as an active area, and light emitted from the active area illuminates the liquid crystal panel.

As described above, in the backlight 300 according to the third embodiment of the present invention, although it is a structure which reduces the number of sheets by using the prism sheet 25, it is possible to curb brightness unevenness in the region of the active area in the vicinity of the light input portion by using the light source 21 that is excellent in the evenness of the light emission intensity distribution in the longitudinal direction and by using the diffusion film 20 disposed at the light input portion of the light guide plate 19. In other words, in the backlight 300 according to the third embodiment of the present invention, by using the LED for the light source, it is possible to obtain effects of reductions in the number of sheets, a designing span, assembly manpower and cost; and utility value of the backlight is not lost.

Fourth Embodiment

Figure 11:
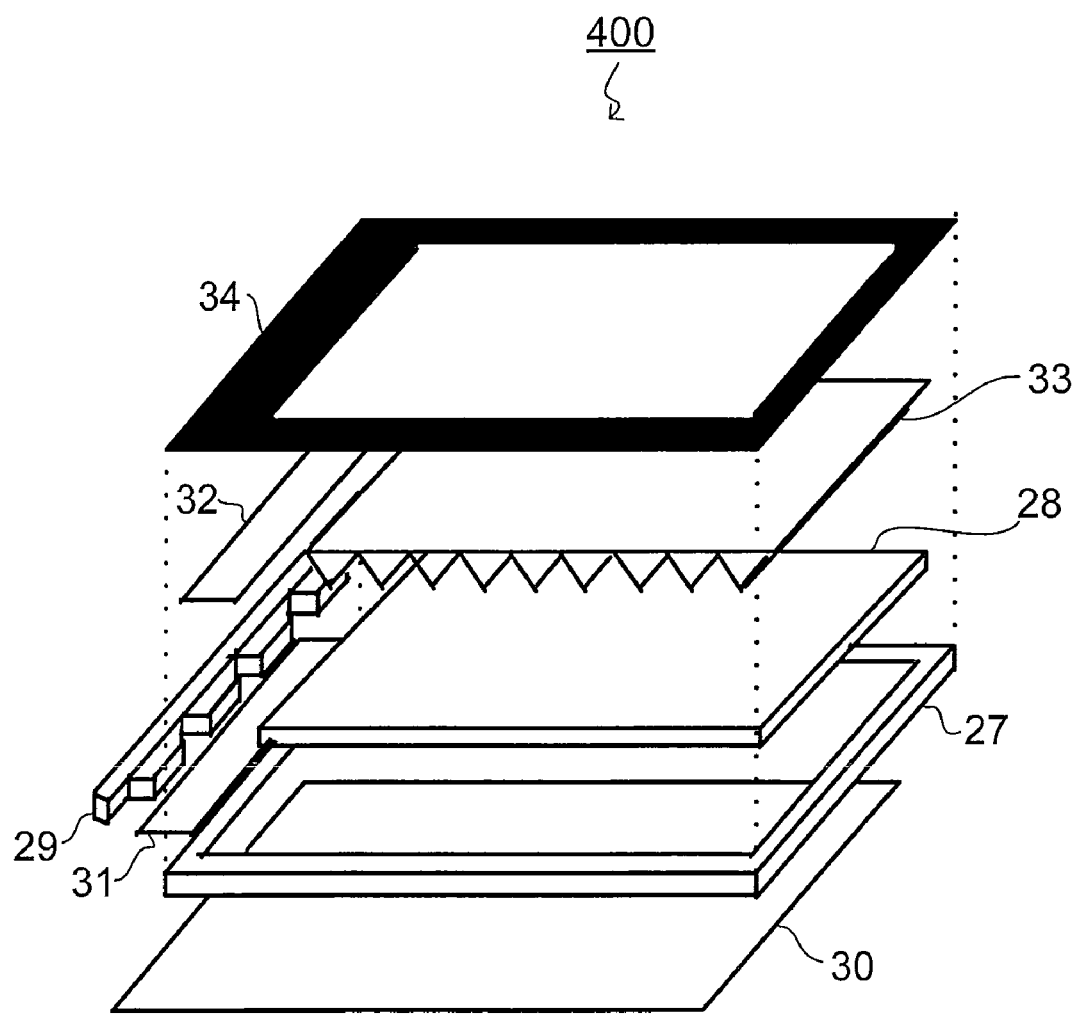
FIG. 11 is an exploded perspective view of a backlight according to a fourth embodiment of the present invention.
Figure 12:
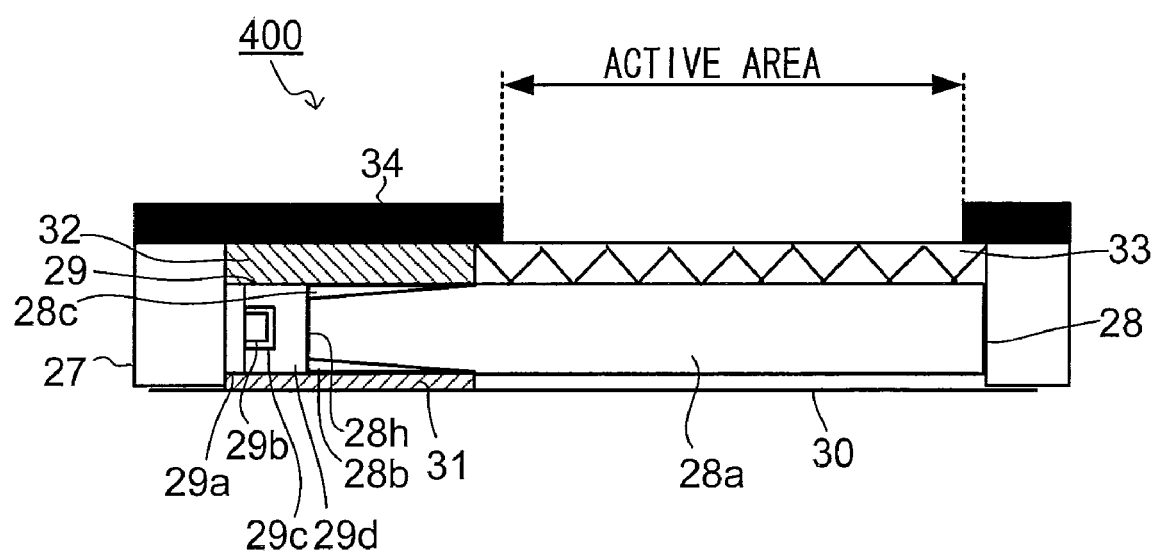
FIG. 12 is a sectional view of the backlight according to the fourth embodiment of the present invention.

In FIG. 11, an exploded perspective view of a backlight 400 according to a fourth embodiment of the present invention is shown. Besides, in FIG. 12, a sectional view of the backlight 400 according to the fourth embodiment of the present invention is shown.

As shown in the figures, the backlight 400 according to the fourth embodiment of the present invention includes: a frame 27; a light guide plate 28; a light source 29; a reflection sheet 30; a lower reflection sheet 31; an upper reflection sheet 32; a prism sheet 33; and a light-block double-coated tape 34.

The frame 27 has a shape that encloses the outer circumference of substantially a rectangular body shape opening portion and is a resin-formed member. In the opening portion of the frame 27, the lower reflection sheet 31, the light source 29, the light guide plate 28, the upper reflection sheet 32 and the prism sheet 33 are housed.

The frame 27 is placed on the reflection sheet 30. Besides, the lower reflection sheet 31 is adhered on the reflection sheet 30 to come into contact with a lower edge of the opening portion of the frame 27. And, the light source 29 and part of the light guide plate 28 are placed on the lower reflection sheet 31.

The light source 29 includes: a printed board 29a; a plurality of LEDs 29b; a plurality of resin-packaged layers 29c; and a plurality of resin-packaged layers 29d; the structure is the same as the light source 4 described in the first embodiment and excellent in evenness of light emission intensity distribution in the longitudinal direction.

Figure 13:
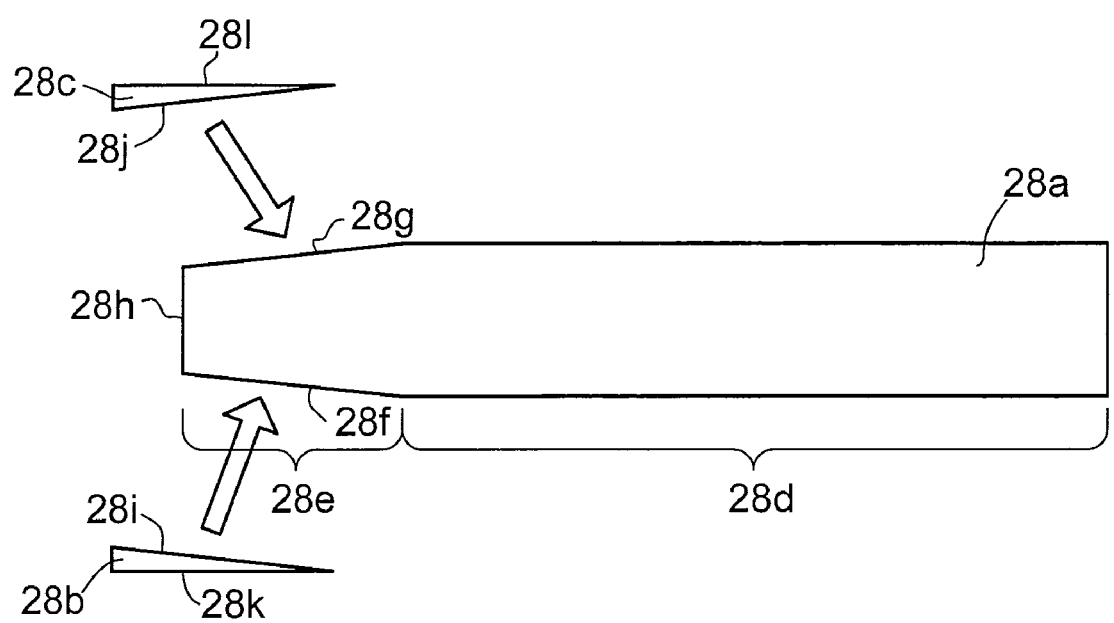
FIG. 13 is a diagram showing assembly of a light guide plate that the backlight according to the fourth embodiment of the present invention includes.

Next, the light guide plate 28 is described. In FIG. 13, assembly of the light guide plate 28 is shown. The light guide plate 28 is composed of: a main body portion 28a; a subsidiary portion 28b; and a subsidiary portion 28c. The main body portion 28a is formed of a resin such as an acryl resin or the like and includes: a prism train forming portion 28d on both surfaces of which prism trains substantially perpendicular to each other are formed; and a tapered portion 28e that is formed on one end of the prism train forming portion 28d such that the thickness becomes small as it goes to the tip end. Uneven surfaces 28f, 28g are formed on two tapered surfaces of the tapered portion 28e by knurling.

Besides, the subsidiary portion 28b and the subsidiary portion 28c are formed of the same resin as that of the main body portion 28a and have a triangle-pole shape that is substantially right triangle in section. An uneven surface 28i is formed on an inclined surface of the subsidiary portion 28b by knurling, while an uneven surface 28j is formed on an inclined surface of the subsidiary portion 28c by knurling. Besides, a surface 28k of the subsidiary portion 28b other than the inclined surface and a surface 28l of the subsidiary portion 28c other than the inclined surface are mirror-surfaced.

And, the uneven surface 28i of the subsidiary portion 28b and the uneven surface 28f of the tapered portion 28e are joined to each other by thermal treatment or the like; the uneven surface 28j of the subsidiary portion 28c and the uneven surface 28g of the tapered portion 28e are joined to each other by thermal treatment or the like; the main body portion 28a, the subsidiary portion 28b and the subsidiary portion 28c are unitarily formed with each other, so that the light guide plate 28 is formed. Here, the uneven surfaces 28f, 28g, 28i and 28j may be uneven surfaces formed by machining other than knurling.

And, a light input surface 28h that is an end surface of the tapered portion 28e of the main body portion 28a faces each resin-packaged layer 29d of the light source 29; and light emitted from the light source 29 enters the light guide plate 28 from the light input surface 28h. A small amount of air is contained in the joint surface between the main body portion 28a and the subsidiary portion 28b of the light guide plate 28 and in the joint surface between the main body portion 28a and the subsidiary portion 28c; and light that enters from the light input surface 28h is reflected and diffused by each joint surface.

Besides, the upper reflection sheet 32 is placed on the subsidiary portion 28c and the light source 29. A reflection surface of the upper reflection sheet 32 faces a side of the light guide plate 28; and the upper reflection sheet 32 has a role in reflecting light that passes through the joint surface between the main body portion 28a and the subsidiary portion 28c of the light guide plate 28 to return it to the light guide plate 28, and raising utility efficiency of light.

Besides, the prism sheet 33 is a transparent sheet on one surface of which a prism train is formed and placed on a prism train on the top surface side of the prism train forming portion 28d of the light guide plate 28 with the prism train faced with the side of the light guide plate 28. And, one surface of the light-block double-coated tape 34 which has such a shape that encloses the circumference of substantially the rectangular-shape opening is adhered on the entire upper surface of the frame 27, the entire edge portion of the upper surface of the prism sheet 33 and the entire upper surface of the upper reflection sheet 32. And, a liquid crystal panel (not shown) is adhered on the other surface of the light-block double-coated tape 34. Light that is input from the light source 29 into the light guide plate 28 is received by the prism trains formed on both surfaces of the light guide plate 28 from the light guide plate 28 into the prism train of the prism sheet 33; and the received light is output from the prism sheet 33 to the liquid crystal panel by the prism train of the prism sheet 33. The opening portion of the light-block double-coated tape 34 serves as an active area, and light emitted from the active area illuminates the liquid crystal panel.

As described above, in the backlight 400 according to the fourth embodiment of the present invention, although it is a structure which reduces the number of sheets by using the prism sheet 33, it is possible to curb brightness unevenness in the region of the active area in the vicinity of the light input portion by using the light source 29 that is excellent in the evenness of the light emission intensity distribution in the longitudinal direction and by using a diffusion pattern (the joint surface between the main body portion 28a and the subsidiary portion 28b and the joint surface between the main body portion 28a and the subsidiary portion 28c) that is disposed in the light input portion of the light guide plate 28. Besides, because a slope is formed on the diffusion pattern so as to allow the distance therebetween to become long up to the thickness of the light guide plate 28 as it goes away from the light source 29, it becomes possible to transmit light from an end portion of the diffusion pattern located on the surface of the light guide plate 28 to the prism sheet 33, so that it is possible to widen the active area. In other words, in the backlight 400 according to the fourth embodiment of the present invention, by using the LED for the light source, it is possible to obtain effects of reductions in the number of sheets, a designing span, assembly manpower and cost; and utility value of the backlight is not lost.

INDUSTRIAL APPLICABILITY

The backlight according to the present invention is able to be built and used in a liquid crystal display apparatus.

The invention claimed is:

1. A backlight comprising:
    a light source that includes a base body that extends in a longitudinal direction, and a plurality of LEDs arranged away from each other on a surface of the base body in the longitudinal direction;
    a light guide plate into an end surface of which light is input from the light source;
    a micro-prism array sheet that is a transparent sheet on one surface of which a plurality of small prisms are formed, is unitarily formed with the light guide plate with the prisms faced with a side of the light guide plate, receives light from the light guide plate and outputs the light to a liquid crystal panel;
    a first reflection sheet that is arranged on a surface side of the light guide plate opposite to the surface of the light guide plate on which the micro-prism array sheet is disposed;
    a diffusion film that is disposed on a surface, in the vicinity of the light source, of the surface of the light guide plate on which the micro-prism array sheet is disposed and diffuses light; and
    a second reflection sheet that is arranged to cover the diffusion film.

2. The backlight according to claim 1, wherein the light source includes a resin portion which is arranged to cover the plurality of LEDs; and in the longitudinal direction, a surface of the resin portion opposite to the base body side includes a recessed portion between the LEDs adjacent to each other in the longitudinal direction.

3. The backlight according to claim 1, wherein the small prism is substantially a trapezoidal rotator and its arrangement density becomes dense as the prism goes away from the light source.

4. The backlight according to claim 1, wherein the diffusion film is a resin transparent film in which opaque beads are irregularly scattered and contained.

5. The backlight according to claim 1, wherein the diffusion film has a structure in which in a resin transparent film, resin transparent particles having a refractive index different from the transparent film are irregularly scattered.

6. The backlight according to claim 1, further comprising a third reflection sheet which is disposed on the first reflection sheet and on a reflection surface of which the light source and part of the light guide plate near a side of the light source are placed.

7. A backlight comprising:
a light source that includes a base body that extends in a longitudinal direction, and a plurality of LEDs arranged away from each other on a surface of the base body in the longitudinal direction;
a light guide plate into an end surface of which light is input from the light source;
a micro-prism array sheet that is a transparent sheet on one surface of which a plurality of small prisms are formed, is unitarily formed with the light guide plate with the prisms faced with a side of the light guide plate, receives light from the light guide plate and outputs the light to a liquid crystal panel;
a first reflection sheet that is arranged on a surface side of the light guide plate opposite to the surface of the light guide plate on which the micro-prism array sheet is disposed;
wherein a first diffusion pattern is disposed in a portion of the light guide plate that is in the vicinity of the light source and near a side of the micro-prism array sheet, and a second diffusion pattern is disposed in a portion of the light guide plate that is in the vicinity of the light source and near a side of the first reflection sheet; and
a second reflection sheet that is arranged so as to cover the first diffusion pattern is further comprised.

8. The backlight according to claim 7, wherein the first diffusion pattern and the second diffusion pattern are inclined such that a distance between them becomes long to a thickness of the light guide plate as they go away from the light source side.

9. The backlight according to claim 7, wherein the light source includes a resin portion which is arranged to cover the plurality of LEDs; and in the longitudinal direction, a surface of the resin portion opposite to the base body side includes a recessed portion between the LEDs adjacent to each other in the longitudinal direction.

10. The backlight according to claim 7, further comprising a third reflection sheet which is disposed on the first reflection sheet and on a reflection surface of which the light source and part of the light guide plate near a side of the light source are placed.

11. A backlight comprising:
a light source that includes a base body that extends in a longitudinal direction, and a plurality of LEDs arranged away from each other on a surface of the base body in the longitudinal direction;
a light guide plate into an end surface of which light is input from the light source and a prism train is formed on both surfaces of a portion far from a side of the light input;
a prism sheet that is a transparent sheet on one surface of which a prism train is formed, and the prism train is arranged on one prism train of the light guide plate with the prism train faced with a side of the light guide plate;
a first reflection sheet that is arranged on a surface side of the light guide plate opposite to the surface of the light guide plate on which the prism sheet is disposed;
a diffusion film that is disposed on a surface, in the vicinity of the light source, of the surface of the light guide plate on which the prism sheet is disposed and diffuses light; and
a second reflection sheet that is arranged to cover the diffusion film.

12. The backlight according to claim 11, wherein the light source includes a resin portion which is arranged to cover the plurality of LEDs; and in the longitudinal direction, a surface of the resin portion opposite to a side of the base body includes a recessed portion between the LEDs adjacent to each other in the longitudinal direction.

13. The backlight according to claim 11, wherein the diffusion film is a resin transparent film in which opaque beads are irregularly scattered and contained.

14. The backlight according to claim 11, wherein the diffusion film may have a structure in which in a resin transparent film, resin transparent particles having a refractive index different from the transparent film are irregularly scattered.

15. The backlight according to claim 11, further comprising a third reflection sheet which is disposed on the first reflection sheet and on a reflection surface of which the light source and part of the light guide plate near a side of the light source are placed.

16. A backlight comprising:
a light source that includes a base body that extends in a longitudinal direction, and a plurality of LEDs arranged away from each other on a surface of the base body in the longitudinal direction;
a light guide plate into an end surface of which light is input from the light source and a prism train is formed on both surfaces of a portion far from a side of the light input;
a prism sheet that is a transparent sheet on one surface of which a prism train is formed, and the prism train is arranged on one prism train of the light guide plate with the prism train faced with a side of the light guide plate;
a first reflection sheet that is arranged on a surface side of the light guide plate opposite to the surface of the light guide plate on which the prism sheet is disposed;
wherein a first diffusion pattern is disposed in a portion of the light guide plate that is in the vicinity of the light source and near a side of the prism sheet, and a second diffusion pattern is disposed in a portion of the light guide plate that is in the vicinity of the light source and near a side of the first reflection sheet; and
a second reflection sheet that is arranged so as to cover the first diffusion pattern is further comprised.

17. The backlight according to claim 16, wherein the first diffusion pattern and the second diffusion pattern are inclined such that a distance between them becomes long to a thickness of the light guide plate as they go away from a side of the light source.

18. The backlight according to claim 16, wherein the light source includes a resin portion which is arranged to cover the plurality of LEDs; and in the longitudinal direction, a surface of the resin portion opposite to a side of the base body includes a recessed portion between the LEDs adjacent to each other in the longitudinal direction.

19. The backlight according to claim 16, further comprising a third reflection sheet which is disposed on the first reflection sheet and on a reflection surface of which the light source and part of the light guide plate near a side of the light source are placed.

* * * * *